G. A. MORRIS.
AUTOMOBILE TIRE TOOL.
APPLICATION FILED MAY 18, 1911.
1,001,670.
Patented Aug. 29, 1911.
2 SHEETS—SHEET 2.
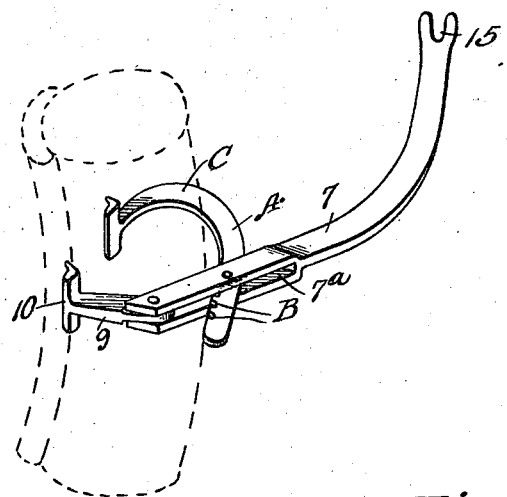
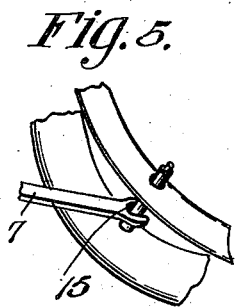
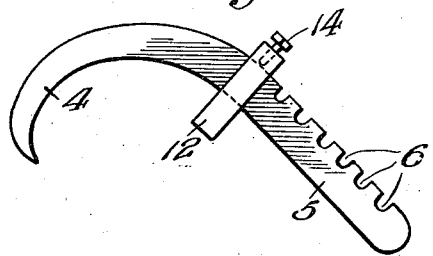
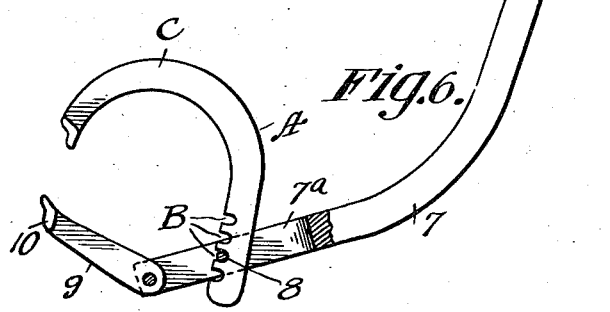
WITNESSES
G. M. Spring.
L. C. Barkley.
INVENTOR
George A. Morris,
by Franks. Addleman, Attorney

UNITED STATES PATENT OFFICE.

GEORGE A. MORRIS, OF ROME, GEORGIA, ASSIGNOR OF THREE-TENTHS TO SHARP & SHARP, A PARTNERSHIP, THREE-TENTHS TO G. J. DAVIS, AND ONE-TENTH TO J. P. SWINFORD, ALL OF ROME, GEORGIA.

AUTOMOBILE TIRE-TOOL.

1,001,670.  Specification of Letters Patent.  Patented Aug. 29, 1911.

Application filed May 18, 1911. Serial No. 627,945.

*To all whom it may concern:*

Be it known that I, GEORGE A. MORRIS, a citizen of the United States of America, and resident of Rome, in the county of Floyd and State of Georgia, have invented certain new and useful Improvements in Automobile Tire-Tools, of which the following is a specification.

This invention relates to implements and tools and particularly to a device designed for use in removing tires from automobile wheels.

An object of this invention is to provide novel means for removing the ordinary retaining ring of an automobile tire, novel means being also provided for dislodging the tire from engagement with the rim and the invention consists furthermore in the provision of novel means for removing the valve stem from the socket in the rim; furthermore, an object of this invention is to provide a movable fulcrum designed to co-act with the rim of a vehicle wheel, which fulcrum is provided for the purpose of holding the tool against swinging movement which would carry the operating handle of the tool beyond the plane of the outer surface of the rim.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1:
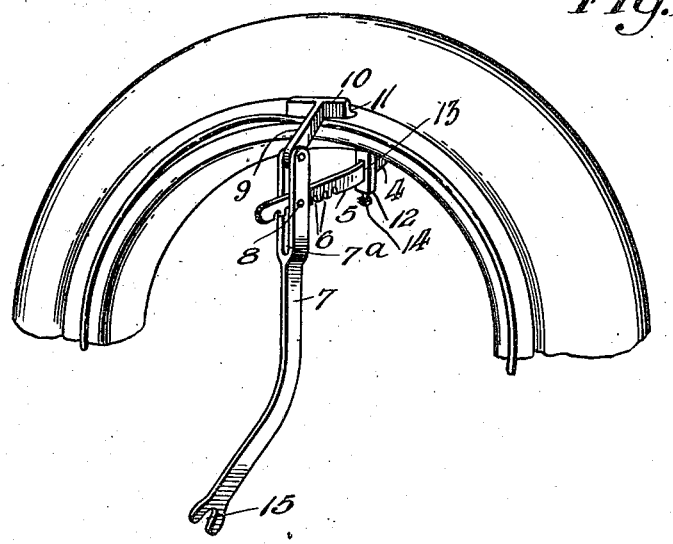
Figure 2:
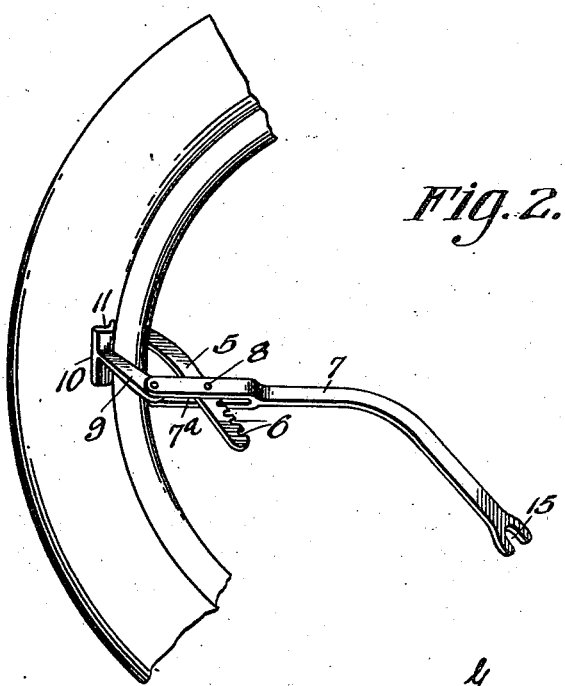

Figure 1 illustrates a perspective view of a fragment of a vehicle wheel with a tire tool applied thereto; Fig. 2 illustrates a perspective view of the opposite side of the wheel shown in Fig. 1 with the tire tool complete for forcing the tire from the rim; Fig. 3 illustrates a perspective view of a fragment of a tire in dotted lines with a tire tool applied thereto, the said tire tool in this form being modified as compared with the one shown in Figs. 1 and 2; Fig. 4 illustrates a detail view of a shank and felly engaging member shown in Figs. 1 and 2; Fig. 5 illustrates a perspective view of a fragment of a tire showing the applicability of the implement for the purpose of removing valve stems from the fellies of wheels; and Fig. 6 illustrates a view in elevation, partly in section of the tool shown in Fig. 3.

In these drawings 4 denotes a hook-shaped member having a shank 5 provided with a series of recesses 6; a handle 7 being connected to the shank by means of the pivotal bolt 8 which is adjustable in the recesses 6 so that the position of the handle with relation to the end of the hooked member may be regulated. The handle has a slot $7^a$ therein through which the pivotal bolt 8 extends and in which slot the shank of the tire engaging member is slidable so that the pivotal bolt may be fitted to the recesses of the shank for the purpose of adjusting the tire engaging member with relation to the handle. The handle has one of its ends pivotally connected to a link 9 which has a head 10 thereon adapted to press against a tire ring for the purpose of displacing the tire from engagement with the rim of a wheel. The head of the link is slightly concaved as shown at 11 in order to correspond to the contour of the outer surface of the tire ring.

The shank 5 is provided with a post 12 slidable thereon, the said post having a slot 13 to receive the shank and the said post is held at different positions of adjustment by a set screw 14. The purpose of the post is to engage the surface of a felly to limit the swinging movement of the shank of the hooked member with relation to the said felly while power is being applied to the handle, thus maintaining the parts in proper position to insure an effective leverage and action of the handle.

The outer end of the handle has a socket 15 therein of such shape as to form a seat for the valve stems of pneumatic tools so that the said handle may be applied to the tool and operated to displace the valve case from the valve socket formed in the felly.

The different uses to which the tool can be put are well illustrated in the drawing, it being shown in Fig. 1 that when the hooked member is caused to engage one edge of the felly and pressure is applied to the handle, the head of the link 9 will dislodge the tire whereas as shown in Fig. 2 of the drawing, the socket in the end of the handle may be utilized to dislodge the valve stem.

The adjustable post is an important part of this invention for the reason that it retains the hook and link in proper position to exert pressure transversely of the felly.

The drawing also illustrates a modified construction of a tire tool which is designed for the purpose of pulling tires from vehicle wheels, the tire pulling member being used in connection with the handle and head heretofore described, thus making the head and handle one element of a compound tool which may be used in conjunction with tire engaging coacting members differing in contour and differing in their attainments. To the end that the modified construction may be understood, the shank A has a series of recesses B in its edge. The shank 5 has its recesses 6 in what may be termed the lower edge, whereas the recesses B are on the opposite edge or what might be termed the upper edge of the shank A. The reason for having the recesses on opposite edges of the different tool members will be obvious when it is considered that the positions of the tools when in operative relations to the felly of a wheel are different in the different forms, the shank being shown as resting on the pivotal pin when the handle is extending downwardly and the other resting on the pivotal pin when the handle is extending upwardly, the positions of the handle being different to accomplish the dislodgment of the tire holding rings and for pressing the tire from engagement with the felly in the former case and being in position to pull the tire from the felly in the second instance. Aside from the differences in the location of the recesses B, the form of the tire engaging tool in the modified construction is different in that the hooked portion C of the shank A is approximately semicircular so that it may embrace the tire on the outer surface and contact with said tire on the inner side of the wheel thereby enabling the said modified tire engaging member to be used for pulling the tire from the felly by the manipulation of the handle.

By having the interchangeable shanks associated with the single handle greater range of utility is given the tire tool and its efficiency is correspondingly increased.

I claim—

1. In a tire tool, a hooked member having a shank provided with recesses, a handle having a pivotal bolt to enter the recesses of the shank, a link pivoted to the handle, said link having a head thereon with a concaved face, and a post adjustable on the shank.

2. In a tire tool, interchangeable hooked tire engaging members having shanks with recesses, a handle having a slot and a pivotal bolt in the handle extending through the slot in which the shanks of the hooked members are slidable and a link pivoted to the handle, said link having a head with a concaved face.

In testimony whereof, I affix my signature in the presence of two witnesses.

GEORGE A. MORRIS.

Witnesses:
C. B. GRETCHINS,
W. H. FOSTER.